United States Patent
Sasakawa

(10) Patent No.: US 11,001,539 B2
(45) Date of Patent: May 11, 2021

(54) COATED GRANULAR FERTILIZER, METHOD FOR PRODUCING COATED GRANULAR FERTILIZER, AND FERTILIZER COMPOSTION

(71) Applicant: Sumitomo Chemical Company, Limited, Tokyo (JP)

(72) Inventor: Mitsuhiro Sasakawa, Hyogo (JP)

(73) Assignee: Sumitomo Chemical Company, Limited, Tokyo (JP)

(*) Notice: Subject to any disclaimer, the term of this patent is extended or adjusted under 35 U.S.C. 154(b) by 199 days.

(21) Appl. No.: 15/757,680

(22) PCT Filed: Sep. 1, 2016

(86) PCT No.: PCT/JP2016/075689
§ 371 (c)(1),
(2) Date: Mar. 6, 2018

(87) PCT Pub. No.: WO2017/043413
PCT Pub. Date: Mar. 16, 2017

(65) Prior Publication Data
US 2019/0023626 A1 Jan. 24, 2019

(30) Foreign Application Priority Data
Sep. 11, 2015 (JP) .............................. JP2015-179657

(51) Int. Cl.
| | | |
|---|---|---|
| *C05G 3/00* | (2020.01) | |
| *C05G 5/30* | (2020.01) | |
| *B01J 2/00* | (2006.01) | |
| *C08G 18/48* | (2006.01) | |
| *C08G 18/66* | (2006.01) | |
| *C08G 18/42* | (2006.01) | |
| *C08G 18/76* | (2006.01) | |
| *C08G 18/40* | (2006.01) | |
| *C05B 7/00* | (2006.01) | |
| *C05C 9/00* | (2006.01) | |
| *C08G 18/32* | (2006.01) | |
| *C08G 18/67* | (2006.01) | |

(52) U.S. Cl.
CPC ........ *C05G 5/37* (2020.02); *B01J 2/00* (2013.01); *B01J 2/003* (2013.01); *C05B 7/00* (2013.01); *C05C 9/005* (2013.01); *C05G 3/00* (2013.01); *C08G 18/3206* (2013.01); *C08G 18/4018* (2013.01); *C08G 18/4277* (2013.01); *C08G 18/48* (2013.01); *C08G 18/4825* (2013.01); *C08G 18/667* (2013.01); *C08G 18/6674* (2013.01); *C08G 18/6755* (2013.01); *C08G 18/7664* (2013.01); *C08G 18/7671* (2013.01); *C08G 2310/00* (2013.01)

(58) Field of Classification Search
CPC ...... C05G 3/0029; C05G 3/00; C05G 3/0058; C05G 3/0035; C08G 18/4018; C08G 18/7671; C08G 18/4277; C08G 18/6674; C08G 18/4825; C08G 18/7664; C08G 18/6755; C08G 18/667; C08G 18/48; C08G 18/3206; C08G 2310/00; C08G 18/7657; C08G 18/6666; C08G 18/36; B01J 2/00; B01J 2/003; B01J 2/006; C05C 9/005; C05B 7/00
See application file for complete search history.

(56) References Cited

U.S. PATENT DOCUMENTS

| | | |
|---|---|---|
| 4,369,055 A | 1/1983 | Fujita et al. |
| 6,176,891 B1 | 1/2001 | Komoriya et al. |
| 6,322,606 B1 | 11/2001 | Komoriya et al. |
| 6,358,296 B1 | 3/2002 | Markusch et al. |
| 6,364,925 B1 | 4/2002 | Markusch et al. |
| 8,888,887 B2 | 11/2014 | Hargrove et al. |
| 2009/0208810 A1 | 8/2009 | Kuroda et al. |
| 2010/0011825 A1 | 1/2010 | Ogle et al. |
| 2010/0151250 A1 | 6/2010 | Watanabe |
| 2010/0196431 A1 | 8/2010 | Watanabe et al. |
| 2016/0297725 A1* | 10/2016 | No ................. C05G 3/0029 |

FOREIGN PATENT DOCUMENTS

| | | |
|---|---|---|
| AU | 1256997 A | 8/1997 |
| CN | 101323545 A | 12/2008 |
| CN | 101648837 A | 2/2010 |
| CN | 101772474 A | 7/2010 |
| CN | 102143927 A | 8/2011 |
| CN | 103304772 A | 9/2013 |

(Continued)

OTHER PUBLICATIONS

Tri-Iso. "BASF Quadrol" <https://www.tri-iso.com/basf-quadrol.html> Jul. 9, 2016.*
Songhan Plastic Technology, "BASF Quadrol Specialty Polymer". <http://www.lookpolymers.com/pdf/BASF-Quadrol-Specialty-Polyol.pdf> Obtained Oct. 21, 2020.*
International Search Report issued in corresponding International Patent Application No. PCT/JP2016/075689 dated Nov. 8, 2016.
International Preliminary Report on on Patentability and Written Opinion issued in corresponding International Patent Application No. PCT/JP2016/075689 dated Mar. 22, 2018.
Office Action issued in counterpart Columbian Patent Application No. NC2018/0002524 dated Aug. 14, 2019.

(Continued)

*Primary Examiner* — Jennifer A Smith
(74) *Attorney, Agent, or Firm* — Morgan, Lewis & Bockius LLP

(57) ABSTRACT

Provided is a coated granular fertilizer, which includes a granular fertilizer and a resin coat that coats the granular fertilizer, in which the resin coat contains a urethane resin that is a polyaddition product between a polyisocyanate component and a polyol component, the polyisocyanate component includes an aromatic polyisocyanate, and the polyol component includes a castor oil-modified diol, an alkylene diol having 2 to 8 carbon atoms, and a compound having three or more hydroxyl groups.

12 Claims, No Drawings

(56) References Cited

FOREIGN PATENT DOCUMENTS

| | | |
|---|---|---|
| CN | 104355824 A | 2/2015 |
| EP | 1106635 A2 | 6/2001 |
| EP | 1172347 A2 | 1/2002 |
| GB | 815829 | 7/1959 |
| GB | 954555 | 4/1964 |
| JP | S44-028457 A | 11/1969 |
| JP | S54-097260 A | 8/1979 |
| JP | S55-090495 A | 7/1980 |
| JP | S56-026797 A | 3/1981 |
| JP | S60-003040 B2 | 1/1985 |
| JP | S60-021952 B2 | 5/1985 |
| JP | S60-037074 B2 | 8/1985 |
| JP | H09-208355 A | 8/1997 |
| JP | H10-265288 A | 10/1998 |
| JP | H10-324587 A | 12/1998 |
| JP | 2001-213685 A | 8/2001 |
| JP | 2002-114591 A | 4/2002 |
| JP | 2008-031034 A | 2/2008 |
| JP | 2008-031466 A | 2/2008 |
| JP | 2008-222536 A | 9/2008 |
| JP | 4983036 B2 | 7/2012 |
| JP | 4983114 B2 | 7/2012 |
| JP | 5412716 B2 | 2/2014 |
| TW | 442448 B | 6/2001 |
| WO | 2015/057267 A1 | 4/2015 |

OTHER PUBLICATIONS

Office Action issued in counterpart Chilean Patent Application No. 201800607 dated Nov. 7, 2018.
Office Action issued in counterpart Chilean Patent Application No. 201800607 dated Jan. 16, 2019.
Office Action issued in counterpart Dominican Republic Patent Application No. P2018-0070 dated Sep. 19, 2019.
Office Action issued in counterpart Indonesian Patent Application No. P00201802644 dated Nov. 29, 2019.
Office Action issued in counterpart Taiwanese Patent Application No. 105128795 dated Dec. 10, 2019.
Office Action issued in counterpart Columbian Patent Application No. NC2018/0002524 dated Nov. 25, 2019.
Office Action issued in counterpart Costa Rican Patent Application No. 2018-000147 dated Mar. 27, 2020.
Office Action issued in counterpart Indian Patent Application No. 201847008187 dated Feb. 28, 2020.
Office Action issued in counterpart Brazilian Patent Application No. 1120180037060 dated Feb. 18, 2020.
Office Action issued in counterpart Colombian Patent Application No. NC2018/0002524 dated Jul. 8, 2020.
Office Action issued in counterpart African Regional Intellectual Property Organization Application No. AP/P/2018/010554 dated Aug. 26, 2020.
Office Action issued in counterpart Taiwanese Patent Application No. 105128795 dated Sep. 4, 2020.

* cited by examiner

COATED GRANULAR FERTILIZER, METHOD FOR PRODUCING COATED GRANULAR FERTILIZER, AND FERTILIZER COMPOSTION

TECHNICAL FIELD

An aspect of the present invention relates to a coated granular fertilizer and a method for producing the same. Another aspect of the present invention relates to a fertilizer composition including a coated granular fertilizer.

BACKGROUND ART

In recent years, due to an increase in the average age of agricultural workers, a decrease in the number of workers, and an increase in the number of farmers with side jobs in Japan, there is a demand for fertilizer effect-regulated type fertilizers that can sustain elution of fertilizer components for a predetermined time period in accordance with the growth of plants, as more labor-saving type fertilizers.

Under such circumstances, coated granular fertilizers in which fertilizers are coated with various coating materials have been suggested. For example, Patent Literatures 1 to 8 disclose fertilizers obtained by using a polyolefin resin and an ethylene-vinyl acetate copolymer as coating materials (Patent Literature 1 and Patent Literature 2); a fertilizer obtained by using a mixture of a polyolefin resin, a polyvinylidene chloride resin, an ethylene-vinyl acetate copolymer, and a sparingly water-soluble inorganic carrier as a coating material (Patent Literature 3); a fertilizer obtained by using an ethylene-vinyl acetate copolymer as a coating material (Patent Literature 4); a fertilizer obtained by using a styrenated alkyd resin and a phenol resin as coating materials (Patent Literature 5); a fertilizer obtained by using a styrene resin, a vinyl chloride resin, a vinylidene chloride resin, and the like as coating materials (Patent Literature 6); a fertilizer obtained by using a urethane resin in which a polyether polyol is used as a polyol component, as a coating material (Patent Literature 7); and the like. Furthermore, recently, coated granular fertilizers obtained by using easily degradable resins as coating materials have also been suggested in consideration of the global environment (Patent Literatures 8 to 10).

CITATION LIST

Patent Literature

Patent Literature 1: Japanese Examined Patent Application Publication No. S60-21952
Patent Literature 2: Japanese Examined Patent Application Publication No. S60-37074
Patent Literature 3: Japanese Examined Patent Application Publication No. S60-3040
Patent Literature 4: Japanese Examined Patent Application Publication No. S44-28457
Patent Literature 5: British Patent No. 954555
Patent Literature 6: British Patent No. 815829
Patent Literature 7: Japanese Unexamined Patent Application Publication No. H9-208355
Patent Literature 8: Japanese Patent No. 4983036
Patent Literature 9: Japanese Patent No. 4983114
Patent Literature 10: Japanese Patent No. 5412716

SUMMARY OF INVENTION

Technical Problem

In regions with high mean air temperature, such as South-East Asia, elution of fertilizer components is accelerated, and therefore, means for making the elution of fertilizer components difficult have been devised for those coated granular fertilizers used in these regions, by increasing the thickness of a resin coating, coating a fertilizer component with a wax in addition to a resin, and the like. However, these methods have problems such as a decrease in the content of a fertilizer component per unit weight of a coated granular fertilizer, and an increase in cost brought by an increase in the coating material (resin raw material) and protraction of the production time.

Solution to Problem

The inventors of the present invention conducted a thorough investigation under such circumstances, and as a result, the inventors found that a coated granular fertilizer prepared by coating a granular fertilizer with a particular urethane resin has excellent sustained release performance, thus completing the present invention.

That is, the present invention includes the following inventions.

[1] A coated granular fertilizer, including a granular fertilizer and a resin coat that coats the granular fertilizer, in which the resin coat includes a urethane resin, which is a polyaddition product between a polyisocyanate component and a polyol component, the polyisocyanate component includes an aromatic polyisocyanate, and the polyol component includes a castor oil-modified diol, an alkylene diol having 2 to 8 carbon atoms, and a compound having three or more hydroxyl groups.

[2] The coated granular fertilizer according to [1], in which the content of the castor oil-modified diol in the polyol component is 6% by mass or more based on the total amount of the polyol component.

[3] The coated granular fertilizer according to [1] or [2], in which the aromatic polyisocyanate includes a compound having two or more benzene rings having an isocyanate group.

[4] The coated granular fertilizer according to any one of [1] to [3], in which the alkylene diol is an alkylene diol having 4 to 6 carbon atoms.

[5] The coated granular fertilizer according to any one of [1] to [4], in which the alkylene diol includes 1,4-butanediol and/or 1,6-hexanediol. [6] The coated granular fertilizer according to any one of [1] to [5], in which the compound having three or more hydroxyl groups includes a polyether polyol.

[7] The coated granular fertilizer according to any one of [1] to [6], in which the compound having three or more hydroxyl groups includes a castor oil-modified polyol.

[8] The coated granular fertilizer according to any one of [1] to [7], in which in the polyol component, the content of the castor oil-modified diol is 6% to 93% by mass based on the total amount of the polyol component, the content of the alkylene diol is 4% to 25% by mass based on the total amount of the polyol component, and the content of the compound having three or more hydroxyl groups is 2% to 87% by mass based on the total amount of the polyol component.

[9] The coated granular fertilizer according to any one of [1] to [8], in which the polyol component is a mixture of 7% to 93% by mass of a castor oil modification product in which the number of hydroxyl groups per molecule is 2, 4% to 25% by mass of an alkylene diol having 2 to 8 carbon atoms, and 2% to 87% by mass of a polyol in which the number of hydroxyl groups per molecule is more than 2.

[10] The coated granular fertilizer according to [9], in which the polyol includes a castor oil modification product in which the number of hydroxyl groups per molecule is more than 2.

[11] The coated granular fertilizer according to any one of [1] to [10], in which the content of the urethane resin is 1 to 20 parts by mass with respect to 100 parts by mass of the granular fertilizer.

[12] A method for producing a coated granular fertilizer that includes a granular fertilizer and a resin coat that coats the granular fertilizer, the method including:

a step of forming the above-mentioned resin coat by performing polyaddition of a polyol component, which is a mixture of 7% to 93% by mass of a castor oil modification product in which the number of hydroxyl groups per molecule is 2; 4% to 25% by mass of an alkylene diol having 2 to 8 carbon atoms; and 2% to 87% by mass of a polyol in which the number of hydroxyl groups per molecule is more than 2, and a polyisocyanate component.

[13] A fertilizer composition, including the coated granular fertilizer according to any one of [1] to [11].

Advantageous Effects of Invention

According to the present invention, a coated granular fertilizer having superior sustained release performance compared to a conventional coated granular fertilizer, in which the amount of resin raw materials used therein is at the same level, can be provided. That is, according to the present invention, the amount of resin raw materials to be used can be reduced. Furthermore, according to the present invention, a method for producing a coated granular fertilizer, the method being capable of producing a coated granular fertilizer having excellent sustained release performance, can be provided. Furthermore, according to the present invention, a fertilizer composition including a coated granular fertilizer having excellent sustained release performance can be provided.

Advantageous Effects of Invention

According to the present invention, a coated granular fertilizer having superior sustained release performance compared to a conventional coated granular fertilizer, in which the amount of resin raw materials used therein is at the same level, can be provided. That is, according to the present invention, the amount of resin raw materials to be used can be reduced. Furthermore, according to the present invention, a method for producing a coated granular fertilizer, the method being capable of producing a coated granular fertilizer having excellent sustained release performance, can be provided. Furthermore, according to the present invention, a fertilizer composition including a coated granular fertilizer having excellent sustained release performance can be provided.

DESCRIPTION OF EMBODIMENTS

Hereinafter, suitable embodiments of the present invention will be explained.

<Coated Granular Fertilizer>

The coated granular fertilizer according to the present embodiment includes a granular fertilizer and a resin coat that coats the granular fertilizer. According to the present embodiment, the resin coat includes a urethane resin, which is a polyaddition product between a polyisocyanate component and a polyol component. Furthermore, according to the present embodiment, the polyisocyanate component includes an aromatic polyisocyanate, and the polyol component includes a castor oil-modified diol, an alkylene diol having 2 to 8 carbon atoms, and a compound having three or more hydroxyl groups.

The granular fertilizer may be a granular material containing a fertilizer component. The granular fertilizer may be, for example, a granular material obtained by granulating a fertilizer component alone, and may be a granular material including a fertilizer component and a carrier for holding the fertilizer component.

The fertilizer component is not particularly limited and can be selected as appropriate according to the use applications and the purpose of use of the coated granular fertilizer, and the like. Examples of the fertilizer component include nitrogenous fertilizer components such as urea, ammonium nitrate, magnesia ammonium nitrate, ammonium chloride, ammonium sulfate, ammonium phosphate, sodium nitrate, calcium nitrate, potassium nitrate, lime nitrogen, formaldehyde-processed urea (UF), acetaldehyde-processed urea (CDU), isobutyl aldehyde-processed urea (IBDU), and guanylurea (GU); phosphatic fertilizers such as superphosphate of lime, double superphosphate of lime, fused phosphate, humic acid phosphate, calcined phosphate, multi-phosphate, magnesia superphosphate, ammonium polyphosphate, potassium metaphosphate, calcium metaphosphate, magnesia phosphate, ammonium sulfate phosphate, potassium ammonium nitrate phosphate, and ammonium chloride phosphate; and potassic fertilizer components such as potassium chloride, potassium sulfate, potash soda sulfate, potash magnesia sulfate, potassium bicarbonate, and potassium phosphate. These fertilizer components may be used singly, or two or more kinds of fertilizer components may be used in combination.

The carrier for holding the fertilizer component can be selected as appropriate according to the type of the fertilizer component, the use applications and the purpose of use of the coated granular fertilizer, and the like. Examples of the carrier include carriers that include mineral matter such as kaolin minerals such as kaolinite, montmorillonite, smectite, talc, agalmatolite, silica, zeolite, and acid clay; plant matter such as cellulose, chaff, starch, and soybean powder; and water-soluble materials such as lactose, sucrose, dextrin, table salt, and sodium tripolyphosphate. The carrier may include one kind of these components alone, or may include a plurality of kinds thereof. Furthermore, the granular fertilizer may include one kind of carrier, or may include two or more kinds of carriers.

The granular fertilizer may further include other components in addition to the fertilizer component and the carrier.

The granular fertilizer can be produced by, for example, a method of granulating a fertilizer component alone, or a method of mixing a fertilizer component with a carrier (also with other components as necessary) and granulating the mixture. The granulation method may be any conventional method for granulating a granular material. Examples of the method include an extrusion granulation method, a fluidized bed type granulation method, a tumbling granulation method, a compression granulation method, a pan granulation method, a coating granulation method, and an adsorption granulation method.

The particle size of the granular fertilizer is not particularly limited and can be selected as appropriate according to the types of the fertilizer component and the carrier, the use applications and the purpose of use of the coated granular fertilizer, or the like. For example, the average particle size of the granular fertilizer may be 0.1 to 15 mm, may be 1 to 10 mm, or may be 1 to 5 mm. According to the present embodiment, a granular fertilizer having an arbitrary particle size can be obtained by, for example, obtaining a granular fertilizer by the production method described above, and then classifying the granular fertilizer using a sieve having an appropriate opening diameter. Meanwhile, in the present specification, the average particle size of the granular fertilizer is defined as an arithmetic mean value of projected area equivalent circle diameters and is measured by a microscopy method.

The shape of the granular fertilizer is not particularly limited and can be selected as appropriate according to the types of the fertilizer component and the carrier, the use applications and the purpose of use of the coated granular fertilizer, and the like. Examples of the shape of the granular fertilizer include a spherical shape, a polyhedral shape, a cylindrical shape, and an irregular shape, and a shape close to a spherical shape is preferred.

According to the present embodiment, the resin coat contains a urethane resin, which is a polyaddition product between a polyisocyanate component and a polyol component.

The polyisocyanate component includes an aromatic polyisocyanate. In the present specification, an aromatic polyisocyanate means a compound having an aromatic ring and two or more isocyanate groups. The aromatic polyisocyanate may be any compound having one aromatic ring in the molecule, or may be a compound having a plurality of aromatic rings. It is preferable that the isocyanate groups contained in the aromatic polyisocyanate are directly bonded to the aromatic ring. The aromatic ring may be a benzene ring.

Specific examples of the aromatic polyisocyanate include 4,4'-diphenylmethane diisocyanate (MDI), tolylene diisocyanate (TDI), xylylene diisocyanate (XDI), tolidine diisocyanate (TODI), naphthalene-1,5-diisocyanate (NDI), tetramethylene xylylene diisocyanate (TMXDI), polymethylene polyphenyl polyisocyanate (polymeric MDI), and derivatives thereof (modification products such as isocyanurate forms, biuret forms, and uretdione forms). The aromatic polyisocyanates may be used singly or may be used in combination of two or more kinds thereof.

From the viewpoint that superior sustained release performance is obtainable, the aromatic polyisocyanate may be an aromatic polyisocyanate having two or more benzene rings, each of the benzene rings having an isocyanate group. In such an aromatic polyisocyanate, the number of isocyanate groups that are directly bonded to each benzene ring may be 1, and the number may also be 2 or more. Examples of such an aromatic polyisocyanate include MDI, TODI, and polymeric MDI.

The polyisocyanate component may include another polyisocyanate other than the aromatic polyisocyanate. Examples of the other polyisocyanate include an aliphatic polyisocyanate and an alicyclic polyisocyanate.

The proportion occupied by the aromatic polyisocyanate in the polyisocyanate component may be 30% by mass or more, may be 50% by mass or more, or may be 100% by mass, from the viewpoint that superior sustained release performance is obtainable.

The polyol component includes a castor oil-modified diol. Meanwhile, in the present specification, a castor oil-modified diol means a compound that can be derived from castor oil by a chemical reaction, the compound having two hydroxyl groups. The castor oil-modified diol may be a product derived from castor oil, and may be a compound that can be derived from castor oil and is produced from a raw material other than castor oil. Castor oil is a fatty oil containing glyceride of ricinoleic acid as a main component, and a castor oil-modified diol may be, for example, a ricinoleic acid-modified diol.

The castor oil-modified diol may be, for example, a compound having one or two or more ester bonds in the molecule. Examples of such a castor oil-modified diol include a transesterification reaction product (product obtainable by a transesterification reaction) between castor oil or hydrogenated castor oil and a diol. Such a castor oil-modified diol may be, for example, an esterification reaction product (product obtainable by an esterification reaction) between ricinoleic acid or 12-hydroxystearic acid and a diol. In the present specification, hydrogenated castor oil refers to a product in which a portion or all of carbon-carbon double bonds in castor oil have been hydrogenated. The polyol component may include only one kind of compound as the castor oil-modified diol, or may include two or more kinds of compounds.

Examples of the diol used for the transesterification reaction or esterification reaction include mehtylpentanediol (for example, 3-methyl-1,5-pentanediol), diethylpentanediol (for example, 2,4-diethyl-1,5-pentanediol), trimethylhexanediol, neopentyl glycol, triethylene glycol, dipropylene glycol, tripropylene glycol, and 1,4-cyclohexanedimethanol.

The hydroxyl value of the castor oil-modified diol is preferably 30 mg KOH/g or more, and more preferably 160 mg KOH/g or more. Furthermore, the hydroxyl value of the castor oil-modified diol is preferably 560 mg KOH/g or less.

The hydroxyl value is a value representing the content of hydroxyl groups per unit mass of a compound. Specifically, the hydroxyl value is the amount (mg) of potassium hydroxide (KOH) required, after obtaining an acetylation product from 1 g of a sample (for example, a castor oil-modified diol), to neutralize the acetic acid bonded to the acetylation product thus obtained. More specifically, the hydroxyl value can be measured by the method defined in Japanese Industrial Standards JIS K 1557.

According to the present embodiment, as the castor oil-modified diol, for example, a diol that is included in castor oil modification products in which the number of hydroxyl groups per molecule is 2, can be used. Regarding the castor oil modification products in which the number of hydroxyl groups per molecule is 2, for example, commercially available products can be used. Examples of the commercially available products include URIC H-62 (hydroxyl value: 245 to 275, manufactured by Itoh Oil Chemicals Co., Ltd.), URIC Y-202 (hydroxyl value: 110 to 120, manufactured by Itoh Oil Chemicals Co., Ltd.), URIC Y-403 (hydroxyl value: 150 to 170, manufactured by Itoh Oil Chemicals Co., Ltd.), URIC Y-332 (hydroxyl value: 113 to 133, manufactured by Itoh Oil Chemicals Co., Ltd.), URIC AC-005 (hydroxyl value: 194 to 214, manufactured by Itoh Oil Chemicals Co., Ltd.), URIC AC-006 (hydroxyl value: 168 to 187, manufactured by Itoh Oil Chemicals Co., Ltd.), URIC PH-5001 (hydroxyl value: 45, manufactured by Itoh Oil Chemicals Co., Ltd.), URIC PH-5002 (hydroxyl value: 43, manufactured by Itoh Oil Chemicals Co., Ltd.), HS 2G-120 (hydroxyl value: 122, manufactured by Hokoku Corporation), HS 2G-160R (hydroxyl value: 121, manufactured by Hokoku Corporation), HS 2G-270B (hydroxyl value: 261, manufactured by Hokoku Corporation), HS 2B-5500 (hydroxyl value: 178, manufactured by Hokoku Corporation), and HS KA-001 (hydroxyl value: 224, manufactured by Hokoku Corporation).

From the viewpoint that superior sustained release performance is obtainable, the content of the castor oil-modified diol in the polyol component may be 6% by mass or more, may be 8% by mass or more, may be 10% by mass or more, may be 30% by mass or more, may be 50% by mass or more, or may be 65% by mass or more, based on the total amount of the polyol component. From the viewpoint that superior sustained release performance is obtainable, the content of the castor oil-modified diol may be 93% by mass or less, may be 90% by mass or less, or may be 85% by mass or less, based on the total amount of the polyol component.

The polyol component further includes an alkylene diol having 2 to 8 carbon atoms (hereinafter, also simply referred to as "alkylene diol"). The number of carbon atoms of the alkylene diol is preferably 3 or more, and more preferably 4 or more, and is preferably 7 or less, and more preferably 6 or less.

The alkylene diol may be linear or branched. Examples of a linear alkylene diol include ethylene glycol, 1,3-propanediol, 1,4-butanediol, 1,5-pentanediol, 1,6-hexanediol, and 1,8-octanediol. Examples of the branched alkylene diol include 2-methyl-1,3-propanediol, 2-methyl-1,4-butanediol, and 2,3-dimethyl-1,4-butanediol.

Regarding the alkylene diol, 1,4-butanediol and 1,6-hexanediol can be suitably used, from the viewpoint that superior sustained release performance is obtainable. Meanwhile, the polyol component may include one kind of compound alone as the alkylene diol, or may include two or more kinds of compounds.

From the viewpoint that superior sustained release performance is obtainable, the content of the alkylene diol in the polyol component may be 4% by mass or more, 6% by mass or more, 8% by mass or more, and 10% by mass or more, based on the total amount of the polyol component. Furthermore, from the viewpoint that superior sustained release performance is obtainable, the content of the alkylene diol may be 25% by mass or less, may be 21% by mass or less, may be 20% by mass or less, may be 18% by mass or less, or may be 15% by mass or less, based on the total amount of the polyol component.

The polyol component further includes a compound having three or more hydroxyl groups. The number of hydroxyl groups contained in the compound may be 3 to 8, or may be 3 to 6.

Examples of the compound having three or more hydroxyl groups include a polyether polyol, castor oil, a castor oil-modified polyol, a poly(meth)acrylic acid polyol, a condensed polyester polyol, and a lactone-based polyester polyol. The compounds having three or more hydroxyl groups may be used singly, or two or more kinds thereof may be used in combination. Meanwhile, regarding the compound having three or more hydroxyl groups, compounds included in commercially available products may be used, and for example, a polyol in which the number of hydroxyl groups per molecule is more than 2 may also be used.

A polyether polyol represents a compound having two or more ether bonds and three or more hydroxyl groups in the molecule. The polyether polyol may be, for example, an addition polymerization product (product obtainable by addition polymerization) between a polyhydric alcohol having three or more hydroxyl groups and an alkylene oxide. Examples of the polyhydric alcohol having three or more hydroxyl groups include glycerin, trimethylolpropane, and pentaerythritol. Examples of the alkylene oxide include ethylene oxide, propylene oxide, butylenes oxide, and tetrahydrofuran. The polyol component may include only one kind of compound as the polyether polyol, or may include two or more kinds of compounds.

From the viewpoint that superior sustained release performance is obtainable, it is preferable that the polyether polyol includes an addition polymerization product between pentaerythritol and propylene oxide.

According to the present embodiment, a compound included in commercially available products may be used as the polyether polyol. Examples of commercially available products including a polyether polyol include SUMIPHEN 3086 (hydroxyl value: 56, manufactured by Sumika Bayer Urethane Co., Ltd.), SUMIPHEN 3900 (hydroxyl value: 35, manufactured by Sumika Bayer Urethane Co., Ltd.), SUMIPHEN 5200 (hydroxyl value: 50, manufacture by Sumika Bayer Urethane Co., Ltd.), SUMIPHEN TS (hydroxyl value: 380, manufactured by Sumika Bayer Urethane Co., Ltd.), SUMIPHEN TM (hydroxyl value: 380, manufactured by Sumika Bayer Urethane Co., Ltd.), SUMIPHEN VN (hydroxyl value: 470, manufactured by Sumika Bayer Urethane Co., Ltd.), SBU POLYOL 0248 (hydroxyl value: 28, manufactured by Sumika Bayer Urethane Co., Ltd.), SBU POLYOL 0363 (hydroxyl value: 23, manufactured by Sumika Bayer Urethane Co., Ltd.), SBU POLYOL 0474 (hydroxyl value: 470, manufactured by Sumika Bayer Urethane Co., Ltd.), SBU POLYOL 480J (hydroxyl value: 430, manufactured by Sumika Bayer Urethane Co., Ltd.), SBU POLYOL 0480 (hydroxyl value: 550, manufactured by Sumika Bayer Urethane Co., Ltd.), SBU POLYOL 0485 (hydroxyl value: 470, manufactured by Sumika Bayer Urethane Co., Ltd.), SBU POLYOL 0487 (hydroxyl value: 410, manufactured by Sumika Bayer Urethane Co., Ltd.), SBU POLYOL J406 (hydroxyl value: 500, manufactured by Sumika Bayer Urethane Co., Ltd.), and SBU POLYOL 0262 (hydroxyl value: 55, manufactured by Sumika Bayer Urethane Co., Ltd.).

In a case in which the polyether polyol includes a plurality of compounds, the number of hydroxyl groups per molecule in the polyether polyol is preferably 3 or more, and is preferably 9 or less or 7 or less.

The hydroxyl value of the polyether polyol is preferably 20 mg KOH/g or more, and more preferably 300 mg KOH/g or more. Furthermore, the hydroxyl value of the polyether polyol is preferably 700 mg KOH/g or less, and more preferably 500 mg KOH/g or less.

A castor oil-modified polyol is a compound that can be derived from castor oil by a chemical reaction, and has three or more hydroxyl groups. The castor oil-modified polyol may be a compound derived from castor oil, and may be a compound that can be derived from castor oil and is produced from a raw material other than castor oil. Castor oil is a fatty oil containing glyceride of ricinoleic acid as a main component. The castor oil-modified polyol may be, for example, a ricinoleic acid-modified polyol.

The castor oil-modified polyol may have, for example, one or two or more ester bonds in the molecule. Examples of such a castor oil-modified polyol include castor oil, hydrogenated castor oil. Furthermore, examples of such a castor oil-modified polyol include a transesterification reaction product between castor oil or hydrogenated castor oil and a polyhydric alcohol having three or more hydroxyl groups. Furthermore, examples of such a castor oil-modified polyol include an esterification reaction product between ricinoleic acid or 12-hydroxystearic acid and a polyhydric alcohol having three or more hydroxyl groups. The polyol component may include only one kind of compound as the castor oil-modified polyol, or may include two or more kinds of compounds.

Examples of the polyhydric alcohol that is used for the transesterification reaction or esterification reaction include a trimethylolalkane, glycerin, and pentaerythritol.

Examples of the castor oil-modified polyol include diglyceride or monoglyceride of ricinoleic acid, a mono-, di-, or triester of ricinoleic acid and a trimethylolalkane, and a mono- or diester of ricinoleic acid and polypropylene glycol.

The hydroxyl value of the castor oil-modified polyol is preferably 50 mg KOH/g or more, and more preferably 85 mg KOH/g or more. Furthermore, the hydroxyl value of the castor oil-modified diol is preferably 500 mg KOH/g or less, and more preferably 350 mg KOH/g or less.

According to the present embodiment, as a castor oil-modified polymer, for example, a compound included in the castor oil modification products in which the number of hydroxyl groups per molecule is more than 2 can be used. Regarding the castor oil modification products in which the number of hydroxyl groups per molecule is more than 2, for example, commercially available products can be used. Examples of the commercially available products include URIC H-52 (number of hydroxyl groups per molecule: 3, hydroxyl value: 195 to 205, manufactured by Itoh Oil Chemicals Co., Ltd.), URIC H-57 (number of hydroxyl groups per molecule: 3, hydroxyl value: 85 to 115, manufactured by Itoh Oil Chemicals Co., Ltd.), URIC H-73X (number of hydroxyl groups per molecule: 3, hydroxyl value: 260 to 280, manufactured by Itoh Oil Chemicals Co., Ltd.), URIC H-81 (number of hydroxyl groups per molecule: 3, hydroxyl value: 330 to 350, manufactured by Itoh Oil Chemicals Co., Ltd.), URIC H-102 (number of hydroxyl groups per molecule: 5, hydroxyl value: 300 to 340, manufactured by Itoh Oil Chemicals Co., Ltd.), URIC H-420 (number of hydroxyl groups per molecule: 3, hydroxyl value: 300 to 340, manufactured by Itoh Oil Chemicals Co., Ltd.), URIC H-854 (number of hydroxyl groups per molecule: 3, hydroxyl value: 205 to 225, manufactured by Itoh Oil Chemicals Co., Ltd.), URIC H-368 (number of hydroxyl groups per molecule: 3, hydroxyl value: 185 to 205, manufactured by Itoh Oil Chemicals Co., Ltd.), URIC F-40 (number of hydroxyl groups per molecule: 3, hydroxyl value: 222 to 242, manufactured by Itoh Oil Chemicals Co., Ltd.), URIC F-60 (number of hydroxyl groups per molecule: 3, hydroxyl value: 205 to 225, manufactured by Itoh Oil Chemicals Co., Ltd.), TLM (number of hydroxyl groups per molecule: 3, hydroxyl value: 159, manufactured by Hokoku Corporation), LAV (number of hydroxyl groups per molecule: 3, hydroxyl value: 159, manufactured by Hokoku Corporation), LM-R (number of hydroxyl groups per molecule: 3, hydroxyl value: 159, manufactured by Hokoku Corporation), ELA-DR (number of hydroxyl groups per molecule: 3, hydroxyl value: 159, manufactured by Hokoku Corporation), and HS PPE-12H (number of hydroxyl groups per molecule: 4, hydroxyl value: 249, manufactured by Hokoku Corporation).

The poly(meth)acrylic acid polyol may be, for example, a condensation reaction product (product obtainable by a condensation reaction) between poly(meth)acrylic acid and a polyhydric alcohol having three or more hydroxyl groups. Examples of the polyhydric alcohol include the same compounds as described above.

The condensed polyester polyol may be, for example, a condensation reaction product between a dicarboxylic acid and a polyhydric alcohol having three or more hydroxyl groups. Examples of the polyhydric alcohol include the same compounds as described above.

The lactone-based polyester polyol may be, for example, a product obtained by ring-opening polymerization of s-caprolactone, in which a polyhydric alcohol having three or more hydroxyl groups is used as an initiator. Examples of the polyhydric alcohol include the same compounds as described above.

The content of the compound having three or more hydroxyl groups in the polyol component may be 2% by mass or more, may be 3% by mass or more, or may be 8% by mass or more, based on the total amount of the polyol component, from the viewpoint that superior sustained release performance is obtained. The content of the compound having three or more hydroxyl groups may be 87% by mass or less, may be 80% by mass or less, may be 76% by mass or less, may be 60% by mass or less, may be 40% by mass or less, or may be 20% by mass or less, based on the total amount of the polyol component, from the viewpoint that superior sustained release performance is obtained.

In a case in which the polyol component includes a polyether polyol, the content of the polyether polyol in the polyol component may be 2% by mass or more, or 3% by mass or more, based on the total amount of the polyol component, from the viewpoint that superior sustained release performance is obtained. Furthermore, the content of the polyether polyol may be 87% by mass or less, may be 50% by mass or less, or may be 30% by mass or less, based on the total amount of the polyol component, from the viewpoint that superior sustained release performance is obtained.

In a case in which the polyol component includes a castor oil-modified polyol, the content of the castor oil-modified polyol in the polyol component may be 2% by mass or more, 5% by mass or more, or 7% by mass or more, based on the total amount of the polyol component, from the viewpoint that superior sustained release performance is obtained. The content of the castor oil-modified polyol may be 87% by mass or less, may be 83% by mass or less, may be 78% by mass or less, may be 60% by mass or less, may be 40% by mass or less, or may be 20% by mass or less, based on the total amount of the polyol component, from the viewpoint that superior sustained release performance is obtained.

The polyol component may include another polyol in addition to the compounds described above. Examples of the other polyol include a polymeric polyol and a polyester polyol.

According to an embodiment, the polyol component may be a mixture of a castor oil modification product in which the number of hydroxyl groups per molecule is 2 (hereinafter, also referred to as "first castor oil modification product"), an alkylene diol having 2 to 8 carbon atoms, and a polyol in which the number of hydroxyl groups per molecule is more than 2. Examples of the polyol in which the number of hydroxyl groups per molecule is more than 2 include a castor oil modification product in which the number of hydroxyl groups per molecule is more than 2 (hereinafter, also referred to as "second castor oil modification product") and a polyether polyol.

According to this embodiment, the amount of the first castor oil modification product with respect to the total amount of the polyol component may be 7% by mass or more, may be preferably 10% by mass or more, may be 30% by mass or more, may be 50% by mass or more, or may be 65% by mass or more, from the viewpoint that superior sustained release performance is obtained. From the viewpoint that superior sustained release performance is obtained, the amount of the first castor oil modification product may be 93% by mass or less, and may be preferably 80% by mass or less.

Furthermore, according to this embodiment, the amount of the alkylene diol having 2 to 8 carbon atoms with respect to the total amount of the polyol component may be 4% by mass or more, may be 6% by mass or more, may be preferably 8% by mass or more, or may be 10% by mass or more, from the viewpoint that superior sustained release performance is obtained. From the viewpoint that superior sustained release performance is obtained, the amount of the alkylene diol having 2 to 8 carbon atoms may be 25% by mass or less, may be 21% by mass or less, may be 20% by mass or less, may be 18% by mass or less, or may be preferably 15% by mass or less.

Furthermore, according to this embodiment, the amount of the polyol in which the number of hydroxyl groups per molecule is more than 2 with respect to the total amount of the polyol component may be 2% by mass or more, and is preferably 8% by mass or more, from the viewpoint that superior sustained release performance is obtained. The amount of the polyol in which the number of hydroxyl groups per molecule is more than 2 may be 87% by mass or less, may be preferably 78% by mass or less, may be 60% by mass or less, may be 40% by mass or less, or may be 20% by mass or less, from the viewpoint that superior sustained release performance is obtained.

According to another embodiment, the urethane resin may be a polyaddition product of a polyisocyanate component that includes 30 to 60 parts by mass of an aromatic polyisocyanate, and a polyol component that includes 5 to 60 parts by mass of a castor oil-modified diol; 3 to 10 parts by mass of an alkylene diol having 2 to 8 carbon atoms; and 2 to 50 parts by mass of a compound having three or more hydroxyl groups.

According to another embodiment, the urethane resin may be a polyaddition product of a polyisocyanate component that includes 30 to 60 parts by mass of an aromatic polyisocyanate, and a polyol component that includes 30 to 60 parts by mass of a castor oil-modified diol; 3 to 10 parts by mass of an alkylene diol having 2 to 8 carbon atoms; and 2 to 20 parts by mass of a polyether polyol.

Furthermore, according to another embodiment, the urethane resin may be a polyaddition product of a polyisocyanate component that includes 30 to 60 parts by mass of an aromatic polyisocyanate, and a polyol component that includes 5 to 60 parts by mass of a castor oil-modified diol; 3 to 10 parts by mass of an alkylene diol having 2 to 8 carbon atoms; and 5 to 50 parts by mass of a castor oil-modified polyol.

According to still another embodiment, the urethane resin may be a polyaddition product of a polyisocyanate component that includes 30 to 60 parts by mass of an aromatic polyisocyanate, and a polyol component that includes 5 to 60 parts by mass of a first castor oil modification product; 3 to 10 parts by mass of an alkylene diol having 2 to 8 carbon atoms; and 2 to 50 parts by mass of a polyol in which the number of hydroxyl groups per molecule is more than 2.

According to still another embodiment, the urethane resin may be a polyaddition product of a polyisocyanate component that includes 30 to 60 parts by mass of an aromatic polyisocyanate, and a polyol component that includes 5 to 60 parts by mass of a first castor oil modification product; 3 to 10 parts by mass of an alkylene diol having 2 to 8 carbon atoms; and 5 to 50 parts by mass of a second castor oil modification product.

Furthermore, according to still another embodiment, the urethane resin may be a polyaddition product of a polyisocyanate component that includes 30 to 60 parts by mass of an aromatic polyisocyanate, and a polyol component that includes 30 to 60 parts by mass of a first castor oil modification product; 3 to 10 parts by mass of an alkylene diol having 2 to 8 carbon atoms; and 2 to 20 parts by mass of a polyether polyol.

The ratio $M_2/M_1$ of the number of moles $M_2$ of hydroxyl groups contained in the polyol component with respect to the number of moles $M_1$ of isocyanate groups contained in the polyisocyanate component is preferably 0.7 or more, and more preferably 0.9 or more, and is preferably 1.7 or less, and more preferably 1.5 or less. When the ratio $M_2/M_1$ is in the range described above, there is a tendency that superior sustained release performance is obtained.

The content of the urethane resin in the resin coat may be 80% by mass or more, may be 90% by mass or more, and may be 100% by mass, based on the total amount of the resin coat.

The content of the urethane resin in the coated granular fertilizer is preferably 1 part by mass or more, and more preferably 2 parts by mass or more, with respect to 100 parts by mass of the granular fertilizer. Furthermore, the content of the urethane resin is preferably 20 parts by mass or less, and more preferably 16 parts by mass or less, with respect to 100 parts by mass of the granular fertilizer.

The resin coat may further contain components other than the particular urethane resin described above. For example, the resin coat may further contain a urethane resin other than the particular urethane resin described above. The resin coat may also contain a solvent such as an organic solvent or water, and these solvents may be the solvents used at the time of producing the urethane resin. Furthermore, the resin coat may further contain a pigment, a dye, and the like.

The urethane resin according to the present embodiment can be obtained by mixing a polyisocyanate component, a polyol component, and optionally other components in addition to these to obtain a mixed liquid, subsequently heating the mixed liquid, and thereby carrying out a polyaddition reaction between the polyisocyanate component and the polyol component.

Examples of the other components for the production of the urethane resin include a catalyst, a pigment, and a dye. Examples of the catalyst include metal salts of organic acids, such as potassium acetate, calcium acetate, dibutyltin diacetate, dibutyltin dichloride, dibutyltin dilaurate, tin dithiobutanoate, tin(II) octanoate, dioctyltin dilaurate, titanium tetraisopropoxide, tetrabutyl titanate, and bismuth(III) tris (2-ethylhexanoate); and amine catalysts such as triethylamine, N,N,N',N'-tetramethylethylenediamine, triethylenediamine, N-methylmorpholine, N-ethylmorpholine, N-dodecylmorpholine, N,N-dimethyldodecylamine, N,N-dimethylcyclohexylamine, dimethylethanolamine, N,N-dimethylbenzylamine, and 2,4,6-tris(dimethylaminomethyl) phenol. A reaction between a hydroxyl group and an isocyanate group can be accelerated by adding the catalyst.

The reaction temperature for the polyaddition reaction may be varied as appropriate according to the types of the polyisocyanate component and the polyol component, the type of the catalyst, and the like. For example, the reaction temperature for the polyaddition reaction may be 40° C. to 150° C., or may be 60° C. to 100° C.

The resin coat may be formed directly on the surface of the granular fertilizer. In a case in which a coat other than the resin coat (for example, a coat of a hydrophobic liquid compound that will be described below) is formed on the surface of the granular fertilizer, the resin coat may be formed on that coat.

The resin coat may be formed so as to cover the entire surface of the granular fertilizer, or may be formed so as to cover a portion of the surface of the granular fertilizer.

The thickness of the resin coat can be selected as appropriate according to the use applications and the purpose of use of the coated granular fertilizer, and the like. The thickness of the resin coat may be, for example, 8 μm or more, and may be preferably 10 μm or more. Furthermore, the thickness of the resin coat may be, for example, 400 μm or less, or may be preferably 200 μm or less. Meanwhile, the thickness of the resin coat in the present specification represents a value measured by an observation made by scanning electron microscopy (SEM) of a cross-section of the coated granular fertilizer. By adjusting the thickness of the resin coat, for example, the sustained release characteristics and the amount of elution of the fertilizer component can be adjusted.

The coated granular fertilizer according to the present embodiment may further include another constituent component in addition to the granular fertilizer and the resin coat, and may further include components in addition to those described above.

For example, the coated granular fertilizer may further include a hydrophobic liquid compound having a boiling point of 100° C. or higher (hereinafter, also referred to as "hydrophobic liquid compound"). In the present specification, a hydrophobic liquid compound means a compound having fluidity at 20° C. and having a water solubility at 20° C. of 10 ppm or less. The hydrophobic liquid compound may be incorporated in the granular fertilizer, or may exist as a coat that coats the granular fertilizer. In a case in which the hydrophobic liquid compound exists as a coat, the coat may be formed directly on the surface of the granular fertilizer, or may be formed on the resin coat that coats the granular fertilizer.

The hydrophobic compound is incorporated when, for example, the coated granular fertilizer is produced by using an apparatus that brings the granular fertilizer into a rolling state. Examples of the hydrophobic compound include aliphatic hydrocarbons such as liquid paraffin; aromatic hydrocarbons such as phenylxylylethane and an alkylbenzene (specifically, SOLVESSO 150, manufactured by ExxonMobil Chemical Company, Inc.); and fatty acid esters such as soybean oil and cotton seed oil. The content of the hydrophobic liquid compound in the coated granular fertilizer may be 0.1 to 5 parts by mass with respect to 100 parts by mass of the granular fertilizer.

The particle size of the coated granular fertilizer can be selected as appropriate according to the use applications and the purpose of use of the coated granular fertilizer, and the like.

For example, the average particle size of the coated granular fertilizer may be 0.1 to 15 mm, or may be 1 to 5 mm. Meanwhile, in the present specification, the average particle size of the coated granular fertilizer is defined as an arithmetic average value of the projected area equivalent circle diameter and is measured by a microscopic method.

The coated granular fertilizer according to the present embodiment has superior sustained release performance, compared to conventional coated granular fertilizers in which the amount of the resin raw materials used is at the same level. That is, in the coated granular fertilizer according to the present embodiment, even if the amount of the resin raw materials is reduced, excessive elution of the fertilizer component is suppressed, and long-term sustained release characteristics can be achieved. Therefore, when the coated granular fertilizer according to the present embodiment is used, the thickness of the resin coat can be made thin, and the percentage content of the fertilizer component in the coated granular fertilizer can be made large. Furthermore, since an increase in the resin raw materials and protraction of the production time can be prevented, reduction of the production cost and the transport cost can be promoted. Furthermore, the coated granular fertilizer according to the present embodiment can be suitably used in, for example, regions with high average atmospheric temperature, such as South-East Asia.

Meanwhile, the term resin raw materials means materials such as a polyisocyanate component and a polyol component, which are used for the formation of the resin coat.

<Fertilizer Composition>

The fertilizer composition according to the present embodiment may be a composition including the coated granular fertilizer described above. The fertilizer composition may include other components in addition to the coated granular fertilizer. Examples of the other components include an antiseptic agent and an anticaking agent.

The content of the coated granular fertilizer in the fertilizer composition according to the present embodiment may be adjusted as appropriate according to the use applications and the purpose of use of the fertilizer composition.

<Method for Producing Coated Granular Fertilizer>

A method for producing a coated granular fertilizer according to the present embodiment includes a step of coating a granular fertilizer with a urethane resin obtained by performing polyaddition of a polyisocyanate component and a polyol component (coating step).

According to an embodiment, the coating step may be a step of, for example, coating a granular fertilizer with a urethane resin that has been synthesized separately.

Furthermore, according to another embodiment, the coating step may be a step of coating a granular fertilizer with a urethane resin by reacting a polyisocyanate component and a polyol component (if necessary, in the presence of a catalyst) in a reaction system including the granular fertilizer. More particularly, the coating step may include the following step (I), step (II), and step (III):

(I) a step of bringing a granular fertilizer into a rolling state in a predetermined apparatus;

(II) a step of adding a polyisocyanate component, a polyol component, and a catalyst that is optionally added to the granular fertilizer that is in a rolling state; and (III) a step of maintaining the state of the granular fertilizer of being rolled, carrying out a reaction (polyaddition) between the isocyanate groups of the polyisocyanate component and the hydroxyl groups of the polyol component, and thus coating the surface of the granular fertilizer with a urethane resin.

In step (I), the granular fertilizer in the rolling state may be heated, if necessary. By heating the granular fertilizer, the reaction between a hydroxyl group and an isocyanate group can be accelerated.

In step (II), the various components may be added separately, or may be added in a mixed state.

According to the present embodiment, it is preferable to repeatedly carry out step (II) and step (III). Since a resin coat is formed by step (II) and step (III), the thickness of the resin coat can be easily adjusted by repeatedly performing step (II) and step (III).

In addition, in step (II), it is preferable to adjust the amounts of the polyisocyanate component and the polyol component to be added, such that the thickness of the resin coat formed by performing step (II) and step (III) one time would be 0.1 to 100 µm.

In the production method described above, the hydrophobic liquid compound described above may be used as necessary. That is, the method for producing a coated granular fertilizer according to the present embodiment may include a step of incorporating a hydrophobic liquid compound into a granular fertilizer, and may include a step of coating a granular fertilizer with a hydrophobic liquid compound. The hydrophobic liquid compound may be added to the granular fertilizer simultaneously with a polyisocyanate component and the like in step (II), may be added to the granular fertilizer before step (II), or may be added to the coated granular fertilizer after step (II). According to the present embodiment, it is preferable that the hydrophobic liquid compound is added to the granular fertilizer before step (II).

Regarding the apparatus that brings a granular fertilizer into a rolling state, known apparatuses such as a jet fluidizing apparatus by which heated air is blown from below, a pan coating apparatus equipped with a heating apparatus, and a concrete mixer can be used.

According to a suitable embodiment of the production method according to the present embodiment, the coating step may be a step of forming a resin coat by performing polyaddition of a polyol component, which is a mixture of 7% to 93% by mass of a castor oil modification product in which the number of hydroxyl groups per molecule is 2; 4% to 25% by mass of an alkylene diol having 2 to 8 carbon atoms; and 2% to 87% by mass of a polyol in which the number of hydroxyl groups per molecule is more than 2, and a polyisocyanate component.

Thus, suitable embodiments of the present invention have been explained; however, the present invention is not intended to be limited to the embodiments described above.

EXAMPLES

Hereinafter, the present invention will be more specifically explained by way of Examples; however, the present invention is not intended to be limited to the Examples.

Example 1

<Preparation of Urethane Raw Material Mixture>

A castor oil modification product in which the number of hydroxyl groups per molecule is 2 (castor oil modification product I), an alkylene diol, and a polyether polyol, which are indicated in Table 1, were mixed, and a solution of polyol component was obtained. Subsequently, the solution thus obtained was heated to 60° C., and an aromatic polyisocyanate as indicated in Table 1 was added, in a state of being heated to 60° C., to the above-mentioned solution. Next, this solution was mixed, and a urethane raw material mixture including an aromatic polyisocyanate, castor oil modification product I, an alkylene diol, and a polyether polyol was obtained. Meanwhile, the amounts of incorporation of the aromatic polyisocyanate, castor oil modification product I, alkylene diol, and polyether polyol were adjusted to the amounts of incorporation (unit: mass %) indicated in Table 1.

<Production of Coated Granular Fertilizer>

In the following method, a coated granular fertilizer in which 1,000 parts by mass of granular urea (urea supergranules, average particle size: about 3 mm, number of granules per gram: about 60 granules) was coated with 100 parts by mass of a urethane resin, which was a reaction product of the urethane raw material mixture, was produced.

First, 1,000 parts by mass of granular urea was brought into a rolling state by introducing the granular urea into a concrete mixer. Subsequently, the granular urea was heated to about 70° C. by means of hot air, subsequently 10 parts by mass of liquid paraffin (manufactured by MORESCO Corporation, trade name: MORESCO WHITE P-350P) was added thereto, and the rolling state was continued for 10 minutes. To this, 10 parts by mass of the urethane raw material mixture was added, and the rolling state was maintained for 8 minutes or longer under heated conditions. Thereby, isocyanate groups and hydroxyl groups in the urethane raw material mixture were allowed to react on the surface of the granular urea.

Furthermore, 10 parts by mass of the urethane raw material mixture was added thereto, and the rolling state was maintained for 8 minutes or longer under heated conditions. This operation was repeatedly carried out until the total amount of the urethane raw material mixture added thereto became 100 parts by mass. Subsequently, cooling to near room temperature, and thereby a coated granular fertilizer of Example 1, in which granular urea was coated by a resin coat containing a urethane resin, was obtained. In the present Example, the aromatic polyisocyanate was added to the solution of polyol component immediately before the urethane raw material mixture was added. That is, regarding the urethane raw material mixture, a mixture prepared immediately before addition was used.

Examples 2 to 4

In Examples 2 to 4, coated granular fertilizers were produced in the same manner as in Example 1, except that the amounts of incorporation of the various mixing components in the urethane raw material mixture were changed to the amounts of incorporation indicated in Table 1.

Examples 5 to 16 and Comparative Examples 1 to 4

In Examples 5 to 16 and Comparative Examples 1 to 4, coated granular fertilizers were produced in the same manner as in Example 1, except that the mixing components of the urethane raw material mixture were changed to the mixing components described in Table 2 or Table 3, and the amounts of incorporation of the various mixing components in the urethane raw material mixture were changed to the amounts of incorporation indicated in Table 2 or Table 3.

Example 17

In Example 17, a coated granular fertilizer was produced in the same manner as in Example 5, except that granular urea was changed to a granular compound fertilizer ($N$—$P_2O_5$—$K_2O$: 10.5-21-23.5, average particle size: about 3 mm, number of granules per gram: about 60 granules), the amount of the urethane raw material mixture added for each time was set to 14 parts by mass with respect to 1,000 parts by mass of the granular compound fertilizer, and the total amount of the amount of addition of the urethane raw material mixture was set to 140 parts by mass.

Example 18

In Example 18, a coated granular fertilizer was produced in the same manner as in Example 5, except that granular urea was changed to a granular compound fertilizer ($N-P_2O_5-K_2O$: 11-16-22, average particle size: about 3 mm, number of granules per gram: about 45 granules), the amount of the urethane raw material mixture added for each time was set to 14 parts by mass with respect to 1,000 parts by mass of the granular compound fertilizer, and the total amount of the amount of addition of the urethane raw material mixture was set to 140 parts by mass.

(Evaluation of Sustained Release Characteristics of Examples 1 to 16 and Comparative Examples 1 to 4)

For the coated granular fertilizers of Examples 1 to 16 and Comparative Examples 1 to 4, an evaluation of sustained release characteristics was performed by the following operation. First, 2.5 g of a coated granular fertilizer was introduced into a sample bottle. To this, 100 g of ion-exchanged water and 120 L of BIOHOPE L (antiseptic agent: isothiazolin-3-one derivative, manufactured by K.I Chemical Industry Co., Ltd.) were added, the sample bottle was covered with a lid, and the sample bottle was left to stand still at 25° C. Subsequently, 0.6 mL of water in the sample bottle (hereinafter, referred to as "measurement sample") was taken after every 7 days, and the elution rate was determined according to the "method for measuring elution rate" described below. The number of days required for the elution rate to exceed 80% was designated as the number of days for 80% elution. The results are presented in Tables 1 to 3.

(Evaluation of Sustained Release Characteristics of Examples 5, 17, and 18)

For the coated granular fertilizers of Examples 5, 17, and 18, an evaluation of the sustained release characteristics was performed by the following operation. First, 300 g of ion-exchanged water was introduced into a sample bottle, the sample bottle was tightly sealed, and then the sample bottle was left to stand in a constant temperature water tank set at 75° C. Thus, the temperature was adjusted to a test temperature. 10 g of the coated granular fertilizer was added to this sample bottle, and the sample bottle was tightly sealed again and was left to stand in a constant temperature tank set at 75° C. Subsequently, 0.6 mL of water (hereinafter, referred to as "measurement sample") was taken after every 12 hours, and the elution rate was determined according to the "method for measuring elution rate" described below. Time required for the elution rate to exceed 80% was designated as time for accelerated 80% elution. The results are presented in Table 4.

(Method for Measuring Elution Rate)

To 0.6 mL of a measurement sample measured into a sample bottle, 8 mL of a color developer (mixture obtained at a mass ratio of ion-exchanged water:p-dimethylamino-benzaldehyde:hydrochloric acid=50:1:5) and 11.4 mL of ion-exchanged water were added, and the liquids were mixed. The mixed liquid thus obtained was analyzed using a spectrophotometer (trade name: UVmini-1240, manufactured by SHIMADZU CORPORATION, measurement wavelength: 420.0 nm), and thereby the urea concentration in the measurement sample was determined. The elution rate was determined from the urea concentration of the measurement sample thus obtained, by the following formula:

Elution rate (%)=(Urea concentration of measurement sample)/(urea concentration at the time of 100% elution)×100

TABLE 1

|  |  | Example 1 | Example 2 | Example 3 | Example 4 |
|---|---|---|---|---|---|
| Polyisocyanate component (mass %) | MDI | 45.9 | 46.6 | 48 | 49.6 |
| Polyol component (mass %) | Castor oil modification product I | 45.3 | 41.9 | 34.9 | 37.3 |
|  | 1,4-Butanediol | 6.3 | 6.4 | 6.6 | 8.6 |
|  | Polyether polyol | 2.5 | 5.1 | 10.5 | 4.5 |
| Total (mass %) |  | 100 | 100 | 100 | 100 |
| Number of days for 80% elution (days) |  | 574 | 525 | 322 | 336 |

TABLE 2

|  |  | Example 5 | Example 6 | Example 7 | Example 8 | Example 9 | Example 10 | Example 11 | Example 12 | Example 13 | Example 14 | Example 15 | Example 16 |
|---|---|---|---|---|---|---|---|---|---|---|---|---|---|
| Polyisocyanate component (mass %) | MDI | 45.5 | 45.8 | 46 | 47.4 | 46 | 47.4 | 46.1 | 49.4 | 44.9 | 43.9 | 44.6 | 41.9 |
| Polyol component (mass %) | Castor oil modification product I | 36.9 | 17.4 | 41.3 | 26.2 | 41.3 | 26.2 | 41.5 | 14.5 | 40.4 | 16.7 | 40 | 8.7 |
|  | 1,4-Butanediol | 6.2 | 6.3 | 6.3 | 6.5 | 6.3 | 6.5 | 6.3 | 6.8 | 6.1 | 6 | 6.1 | 5.7 |
|  | Castor oil modification product A | 11.4 | 30.5 | — | — | — | — | — | — | — | — | — | — |
|  | Castor oil modification product B | — | — | 6.4 | 19.9 | — | — | — | — | — | — | — | — |
|  | Castor oil modification product C | — | — | — | — | 6.4 | 19.9 | — | — | — | — | — | — |
|  | Castor oil modification product D | — | — | — | — | — | — | 6.1 | 29.3 | — | — | — | — |

TABLE 2-continued

|  | Example 5 | Example 6 | Example 7 | Example 8 | Example 9 | Example 10 | Example 11 | Example 12 | Example 13 | Example 14 | Example 15 | Example 16 |
|---|---|---|---|---|---|---|---|---|---|---|---|---|
| Castor oil modification product E | — | — | — | — | — | — | — | — | 8.6 | 33.4 | — | — |
| Castor oil modification product F | — | — | — | — | — | — | — | — | — | — | 9.3 | 43.7 |
| Total (mass %) | 100 | 100 | 100 | 100 | 100 | 100 | 100 | 100 | 100 | 100 | 100 | 100 |
| Number of days for 80% elution (days) | 546 | 322 | 581 | 329 | 644 | 357 | 602 | 343 | 728 | 392 | 700 | 392 |

TABLE 3

|  |  | Comparative Example 1 | Comparative Example 2 | Comparative Example 3 | Comparative Example 4 |
|---|---|---|---|---|---|
| Polyisocyanate component (mass %) | MDI | 43.5 | 58.4 | 38.3 | 53.3 |
| Polyol component (mass %) | Castor oil modification product I | — | — | — | — |
|  | 1,4-Butanediol | 6 | 8 | 5.2 | 5.8 |
|  | Polyether polyol | 7.2 | 6.4 | 6.5 | 40.9 |
|  | Polycaprolactone diol | 43.3 | — | — | — |
|  | Polyether diol | — | 27.2 | — | — |
|  | Castor oil | — | — | 50 | — |
| Total (mass %) |  | 100 | 100 | 100 | 100 |
| Number of days for 80% elution (days) |  | 210 | 56 | 168 | 133 |

TABLE 4

|  |  | Example 5 | Example 17 | Example 18 |
|---|---|---|---|---|
| Polyisocyanate component (mass %) | MDI | 45.5 | 45.5 | 45.5 |
| Polyol component (mass %) | Castor oil modification product I | 36.9 | 36.9 | 36.9 |
|  | 1,4-Butanediol | 6.2 | 6.2 | 6.2 |
|  | Castor oil modification product A | 11.4 | 11.4 | 11.4 |
| Total (mass %) |  | 100 | 100 | 100 |
| Time for accelerated 80% elution (hours) |  | 92 | 96 | 100 |

The details of the various descriptions in Tables 1 to 4 are as follows.

MDI [manufactured by Sumika Bayer Urethane Co., Ltd., trade name: SUMIDUR 44S]

Castor oil modification product I [manufactured by Itoh Oil Chemicals Co., Ltd., trade name: URIC H-62, number of hydroxyl groups per molecule: 2, hydroxyl value: 274]

Polycaprolactone diol [manufactured by Daicel Corporation, trade name: PLACCEL 205, hydroxyl value: 224]

Polyether diol [manufactured by Sumika Bayer Urethane Co., Ltd., trade name: SBU POLYOL 0497, hydroxyl value: 510]

Castor oil [manufactured by Hokoku Corporation, trade name: CASTOR OIL No. 1 Industrial Grade, hydroxyl value: 160]

1,4-Butanediol [manufactured by BASF Idemitsu Co., Ltd., trade name: 1,4-BDO, hydroxyl value: 1247]

Polyether polyol [manufactured by Sumika Bayer Urethane Co., Ltd., trade name: SBU POLYOL 487, number of hydroxyl groups per molecule: 4, hydroxyl value: 408]

Castor oil modification product A [manufactured by Itoh Oil Chemicals Co., Ltd., trade name: URIC H-73X, number of hydroxyl groups per molecule: 3, hydroxyl value: 270]

Castor oil modification product B [manufactured by Itoh Oil Chemicals Co., Ltd., trade name: URIC H-102, number of hydroxyl groups per molecule: 5, hydroxyl value: 320]

Castor oil modification product C [manufactured by Itoh Oil Chemicals Co., Ltd., trade name: URIC H-420, number of hydroxyl groups per molecule: 3, hydroxyl value: 320]

Castor oil modification product D [manufactured by Itoh Oil Chemicals Co., Ltd., trade name: URIC H-81, number of hydroxyl groups per molecule: 3, hydroxyl value: 340]

Castor oil modification product E [manufactured by Itoh Oil Chemicals Co., Ltd., trade name: URIC F-40, number of hydroxyl groups per molecule: 3, hydroxyl value: 236]

Castor oil modification product F [manufactured by Itoh Oil Chemicals Co., Ltd., trade name: URIC F-60, number of hydroxyl groups per molecule: 3, hydroxyl value: 215]

The invention claimed is:

1. A method for producing a coated granular fertilizer that includes a granular fertilizer and a resin coat coating the granular fertilizer, the method comprising:
performing polyaddition of a polyol component and a polyisocyanate component, thereby forming the resin coat, wherein the polyol component is a mixture of: a castor oil modification product having 2 hydroxyl group per molecule; an alkylene diol having 4 to 6 carbon atoms; and a compound having three or more hydroxyl groups, wherein the compound having three or more hydroxyl groups includes a polyether polyol, which is a polymerization product between polyhydric alcohol having three or more hydroxyl group and an alkylene oxide, or a castor oil-modified polyol, wherein the polyisocyanate component includes an aromatic polyisocyanate, and the aromatic polyisocyanate component includes a compound having two or more benzene rings, each benzene ring having an isocyanate group.

2. The method according to claim 1, wherein the polyhydric alcohol having three of more hydroxyl group comprises glycerin.

3. The method according to claim 1, wherein the polyhydric alcohol having three of more hydroxyl group comprises trimethylolpropane.

4. The method according to claim 1, wherein the polyhydric alcohol having three of more hydroxyl group comprises pentaerythritol.

5. The method according to claim 1, wherein the alkylene oxide comprises ethylene oxide, propylene oxide, butylene oxide, or tetrahydrofuran.

6. A coated granular fertilizer, comprising:
a granular fertilizer; and
a resin coat coating the granular fertilizer,
wherein the resin coat contains a urethane resin, which is a polyaddition product between a polyisocyanate component and a polyol component,
the polyisocyanate component includes an aromatic polyisocyanate, and
the polyol component includes a castor oil-modified diol, an alkylene diol having 4 to 6 carbon atoms, and a compound having three or more hydroxyl groups,
wherein the compound having three or more hydroxyl groups includes a polyether polyol or a castor oil-modified polyol, wherein the polyether polyol is a polymerization product between a polyhydric alcohol having three of more hydroxyl group and an alkylene oxide, and
the aromatic polyisocyanate includes a compound having two or more benzene rings, each benzene ring having an isocyanate group.

7. The coated granular fertilizer according to claim 6, wherein the content of the castor oil-modified diol is 6% to 93% by mass based on the total amount of the polyol component.

8. The coated granular fertilizer according to claim 6, wherein the content of the alkylene diol is 4% to 25% by mass based on the total amount of the polyol component.

9. The coated granular fertilizer according to claim 6, wherein the content of the compound having three or more hydroxyl groups is 2% to 87% by mass based on the total amount of the polyol component.

10. The coated granular fertilizer according to claim 6, wherein the alkylene oxide comprises one selected from the group consisting of ethylene oxide, propylene oxide, butylene oxide, tetrahydrofuran, and combinations thereof.

11. The coating granular fertilizer according to claim 6, wherein the polyhydric alcohol having three of more hydroxyl group comprises glycerin.

12. A coated granular fertilizer, comprising:
a granular fertilizer; and
a resin coat coating the granular fertilizer,
wherein the resin coat contains a urethane resin, which is a polyaddition product between a polyisocyanate component and a polyol component,
the polyisocyanate component includes an aromatic polyisocyanate, and
the polyol component includes a castor oil-modified diol, an alkylene diol having 4 to 6 carbon atoms, and a compound having three or more hydroxyl groups,
wherein the compound having three or more hydroxyl groups includes a polyether polyol or a castor oil-modified polyol, wherein the polyether polyol is a polymerization product between a polyhydric alcohol having three of more hydroxyl group and an alkylene oxide, and
the aromatic polyisocyanate includes a compound having two or more benzene rings, each benzene ring having an isocyanate group,
the content of the castor oil-modified diol is 6% to 93% by mass based on the total amount of the polyol component,
the content of the alkylene diol is 4% to 25% by mass based on the total amount of the polyol component, and
the content of the compound having three or more hydroxyl groups is 2% to 87% by mass based on the total amount of the polyol component.

\* \* \* \* \*